US011451395B2

(12) United States Patent
Jin et al.

(10) Patent No.: US 11,451,395 B2
(45) Date of Patent: Sep. 20, 2022

(54) METHODS FOR OPTICAL IMAGE ENCRYPTION AND DECRYPTION BASED ON BIOLOGICAL INFORMATION

(71) Applicant: Zhejiang Normal University, Jinhua (CN)

(72) Inventors: Weimin Jin, Jinhua (CN); Xueru Sun, Jinhua (CN); Lihong Ma, Jinhua (CN)

(73) Assignee: Zhejiang Normal University

( * ) Notice: Subject to any disclaimer, the term of this patent is extended or adjusted under 35 U.S.C. 154(b) by 0 days.

(21) Appl. No.: 17/215,792

(22) Filed: Mar. 29, 2021

(65) Prior Publication Data
US 2022/0052851 A1  Feb. 17, 2022

(30) Foreign Application Priority Data
Aug. 12, 2020 (CN) .......................... 202010804755.2

(51) Int. Cl.
*H04L 9/32* (2006.01)
*G06F 21/60* (2013.01)
*H04L 9/00* (2022.01)
*H04L 9/30* (2006.01)

(52) U.S. Cl.
CPC .......... *H04L 9/3231* (2013.01); *G06F 21/602* (2013.01); *H04L 9/001* (2013.01); *H04L 9/3013* (2013.01)

(58) Field of Classification Search
CPC ..... H04L 9/3231; H04L 9/3013; H04L 9/001; G06F 21/602; G06F 21/31; G06F 21/32
See application file for complete search history.

(56) References Cited

U.S. PATENT DOCUMENTS

| | | | | |
|---|---|---|---|---|
| 6,744,909 B1 * | 6/2004 | Kostrzewski | ........ | G06V 10/895 382/210 |
| 7,095,540 B1 * | 8/2006 | Javidi | ................. | G06V 10/895 382/209 |
| 7,317,814 B2 * | 1/2008 | Kostrzewski | ........... | G06E 3/001 382/211 |
| 7,684,098 B2 * | 3/2010 | Javidi | ................. | G06V 10/895 382/209 |
| 8,135,181 B2 * | 3/2012 | Zhang | ................. | G06V 40/107 382/115 |
| 8,150,033 B2 * | 4/2012 | Javidi | ................. | G06V 10/895 380/54 |
| 9,824,287 B2 * | 11/2017 | Wang | ..................... | A61B 5/681 |
| 9,946,942 B2 * | 4/2018 | Wang | ..................... | A61B 5/681 |

* cited by examiner

*Primary Examiner* — Hosuk Song
(74) *Attorney, Agent, or Firm* — Edmonds & Cmaidalka, P.C.

(57) ABSTRACT

Image encryption and decryption methods based on biological information. The encryption method includes: obtaining the biological information; using the chaotic mapping method to preprocess the biological information to construct the first chaotic biological phase plate and the second chaotic biological phase plate; obtaining the original image to be encrypted and use the first chaotic biological phase plate and the second chaotic biological phase plate to determine the reconstructed optical encrypted image based on the discrete cosine transform method, and Fresnel transform method; and inputting reference light that interferes with the encrypted image of the reproduction light to determine the encrypted image. The invention can reduce the information amount of the key, improve the efficiency of storage and transmission, and improve security.

20 Claims, 4 Drawing Sheets

METHODS FOR OPTICAL IMAGE ENCRYPTION AND DECRYPTION BASED ON BIOLOGICAL INFORMATION

CROSS-REFERENCE TO RELATED APPLICATIONS

This application claims priority to Chinese Patent Application having serial number 202010804755.2, filed on Aug. 12, 2020. The entirety of which is incorporated by reference herein.

BACKGROUND OF THE INVENTION

Field of the Invention

The invention relates to optical image encryption and decryption. More particularly, the invention relates to methods for optical image encryption and decryption based on biological information.

Description of the Related Art

Images (especially color) have become one of the most important means for humans to express information. Now, people can release image information on the Internet, conveniently and quickly, but easily used by criminals, damaging a person's own interests. In particular, military satellite images, new weapons, military facilities drawings, architectural drawings of financial institutions, and hospital patients' data are susceptible. In ordinary life, people often use ID cards, credit cards, and other valid documents, and need safe and stable anti-counterfeiting marks. If an image is counterfeited, it can cause great losses to a country, enterprises, or individuals. Therefore, information security is not only the focus of scientific research, but also an urgent need of social development.

The proposed optical encryption methods include double random phase coding, phase iterative algorithm encryption, optical encryption of diffraction optical elements, polarization encryption, chaotic sequence encryption and pixel scrambling. Among them, the double random phase coding technology proposed by B. Javidi and others is the most representative encryption technology at present. The key is the random phase mask used as the key, which has a very high resolution. Millions of pixels are distributed in the area of several square millimeters, so the key space is very large. It is difficult to recover the encryption by blind deconvolution without knowing the key phase distribution images. Moreover, the phase distribution of the random phase mask cannot be captured by a light intensity detector such as CCD, so it is difficult to copy, has high security, and is not easy to be cracked. There are many kinds of optical systems used for encryption, such as Fourier transform 4f system, (generalized) fractional Fourier transform system, Fresnel transform system, wavelet transform system, and so on. Because fractional-order and Fresnel diffraction distance can be used as new keys, the security of (generalized) fractional Fourier transform system and Fresnel transform system is higher than that of the 4f system. The encrypted information of these schemes is usually complex, so it is difficult to record directly without holographic technology.

Holographic technology can easily record complex information, but traditional holographic recording materials cannot be transmitted in the network, and digital holographic technology can solve this problem. Digital holography includes computer-generated hologram. The digital holography here refers to the holography recorded by digital recording media (such as CCD, CMOS). A computer-generated hologram (CGH) is a kind of holographic technology that can directly calculate the light field distribution of a hologram without designing the optical path. CGH is more flexible and convenient. The research on computer-generated hologram encryption includes: using Fresnel computer-generated hologram to carry on the encryption storage of random coherent decomposition of information, using random phase encoding method to encrypt Fresnel computer hologram, by disrupting the encryption of Fresnel digital (computer) hologram distribution, using pixel scrambling technology to encrypt Fourier transform computer hologram and decomposing three-dimensional data into multi-layer two-dimensional data. Some people have also studied the influence of different contrast on the reconstructed quality of encrypted Fresnel CGH. Digital holography, especially computer-generated hologram, can get real value, not complex information, and is digital, which is easy to save and transmit.

In the above encryption schemes, there is no strong link between the key and its owner, which makes it possible for anyone to use the key. If the key is stolen or lost, the security of these encryption schemes will be threatened. Biological information, such as fingerprint, iris, face, and voiceprint, is unique and unchangeable, which can avoid this kind of threat. In recent years, biological information (fingerprint) has been introduced into the field of optical encryption. For example, Tashima et al. and Takeda proposed an encryption scheme combining fingerprint keys with double random phase coding, which enhanced the security and avoided some attacks. Zhao et al. proposed an image encryption scheme based on phase retrieval and RSA algorithm, using fingerprint as the key. Yan et al. proposed a multi-depth target image encryption scheme based on optical heterodyne technology and fingerprint key. Wei et al. proposed an image encryption scheme based on two-dimensional code and a multilevel fingerprint in the GT domain. The two-dimensional code generated from the original image was encrypted into ciphertext by multilevel fingerprint key placed on the cascaded GTS transform plane. Zhu et al. proposed an image encryption scheme based on CGI and fingerprint phase mask, in which the phase mask key is generated by digital holography and fingerprint. Verma et al. proposed an asymmetric image encryption scheme based on phase retrieval algorithm, phase truncation FT, and fingerprint key, and used digital holographic technology to generate fingerprint key. Su et al. proposed a color image encryption method based on a chaotic fingerprint phase mask, which is made of chaotic map and fingerprint. Tao et al. proposed an asymmetric image encryption scheme based on chaotic palmprint phase mask and singular value decomposition. The phase mask key is generated by a 2D Henon map and palmprint. Biological information is unique and unchangeable, and it is not easily stolen or lost. In the process of optical encryption and decryption, the key to biological information is used to ensure the specificity of users and further improve the security of the system.

The chaotic sequence of the deterministic nonlinear systems is used to construct the phased array, which has the characteristics of quasi randomness and high confidentiality. Even if the initial state of a nonlinear system has a very small difference, it will lead to different chaotic sequences, so there is a huge difference between the phase arrays. Compared with the double random phase coding technology, the random phase coding technology based on chaotic sequence takes the initial condition of a chaotic sequence as the key, which reduces the amount of key data and is conducive to transmission.

According to the above analysis, the problems of the existing optical encryption technology are: the amount of information of the key is large, which is not conducive to preservation and transmission; the key has little association with the owner, so anyone can use it, and if it is lost or stolen, the security is threatened; the encrypted information is generally plural, which is not convenient for storage and transmission.

SUMMARY OF THE INVENTION

The purpose of the invention is to provide optical image encryption and decryption methods based on biological information, to solve the problems of the existing encryption technology, such as the large amount of information of the key, the disadvantage of saving and transmission, and the low security.

To achieve the above purposes and others, embodiments of the present invention provide image encryption methods based on biological information that include: the biological information includes fingerprint, iris, face, palm print, and voiceprint; the first chaotic biological phase plate and the second chaotic biological phase plate are constructed by using the chaotic mapping method to preprocess the biological information; acquiring the original image to be encrypted, performing discrete cosine transform on the original image to be encrypted, and determining the encrypted image after discrete cosine transform; multiplying the first chaotic biological phase plate with the encrypted image after discrete cosine transform to determine the encrypted image modulated by the first chaotic biological phase plate; performing Fresnel transformation on the encrypted image modulated by the first chaotic biological phase.

According to the encrypted image after the second phase truncation and phase preservation, the reference light can be introduced for interference through Fresnel diffraction, and the light intensity distribution of the plane hologram can be output; the light intensity distribution of the plane hologram can be the encrypted image plate to determine the encrypted image after the first Fresnel transformation; performing phase truncation and phase preservation on the encrypted image after the first Fresnel transform, and determining the encrypted image after the first phase truncation and phase preservation; using the second chaotic biological phase plate to multiply the encrypted image after the first phase truncation and phase preservation to determine the encrypted image after the second phase truncation and phase preservation; performing Fresnel transform on the encrypted image after the second phase truncation and phase preservation to determine the encrypted image after the second Fresnel transform; performing phase truncation and phase preservation on the encrypted image after the second Fresnel transform to obtain the encrypted image after the second phase truncation and phase preservation.

According to the encrypted image after the second phase truncation and phase preservation, the reference light can be introduced for interference through Fresnel diffraction, and the light intensity distribution of the plane hologram is output; the light intensity distribution of the plane hologram is the encrypted image.

Optionally, performing Fresnel transform on the encrypted image modulated by the first chaotic biological phase plate to determine the encrypted image after the first Fresnel transform, specifically including:

Performing Fresnel transformation on the encrypted image modulated by the first chaotic biological phase plate according to the formula $f(x_1, y_1)=FrT_{Z1}\{f'(x_0, y_0)\exp[j2\pi\phi(x_0, y_0)]\}$ to determine the encrypted image after the first Fresnel transformation;

Where $f(x_1, y_1)$ is the encrypted image after the first Fresnel transform; FRT is the Fresnel transform; $z_1$ is the first transform distance; $f'(x_0, y_0)$ is the encrypted image after the discrete cosine transform; $\phi(x_0, y_0)$ is the phase distribution function in the $(x_0, y_0)$ domain; and j is the imaginary number.

Optionally, performing phase truncation and phase preservation on the encrypted image after the first Fresnel transform, and determining the encrypted image after the first phase truncation and phase preservation, specifically including:

According to formulas $PT\{f(x_1, y_1)\}=|f(x_1, y_1)|$ and $PR\{f(x_1, y_1)\}=\exp[j2\pi\phi(x_1, y_1)]=RPM_1$, phase truncation and phase preservation are performed on the encrypted image after the first Fresnel transform to determine the encrypted image after the first phase truncation and phase preservation;

According to formulas $PT\{f(x_2, y_2)\}=|f(x_2, y_2)|$ and $PR\{f(x_2, y_2)\}=\exp[j2\pi\phi(x_2, y_2)]=RPM_2$, phase truncation and phase preservation are performed on the encrypted image after the second Fresnel transform to obtain the encrypted image after the second phase truncation and phase preservation;

Where $f(x_2, y_2)$ is the encrypted image after the second Fresnel transform; $PT\{f(x_2, y_2)\}$ is the phase truncation in $x_2, y_2$ domain; $PR\{f(x_2, y_2)\}$ is the phase reservation in $x_2, y_2$ domain; $\phi(x_2, y_2)$ is the phase distribution function in $x_2, y_2$ domain; and $RPM_2$ is the second key.

The invention relates to an image decryption method based on biological information, and the decryption method comprises the following steps:

Obtaining users' biological information;

Judging whether the user is a legal user according to the biological information of the user;

If so, acquiring the first key and the second key, and irradiating the encrypted image with reference light;

According to the first key and the second key, the Fresnel inverse transform method and the chaotic mapping method are used to decrypt the encrypted image after irradiation to obtain the original image;

If not, stop decryption.

Alternatively, according to the first key and the second key, the method uses the Fresnel inverse transform method and the chaotic mapping method to decrypt the encrypted image after irradiation and obtain the original image, specifically including:

The encrypted image is illuminated by reference light to determine the reconstructed encrypted image;

Performing inverse Fresnel transform on the reconstructed optical encrypted image to determine the decrypted image after one inverse Fresnel transform;

Multiplying the decrypted image after the first inverse Fresnel transform with the second key to determine the first decrypted image;

The image is deciphered by the inverse Fresnel transform;

Multiplying the decrypted image after the second inverse Fresnel transform by the conjugate of the first chaotic biological phase plate to determine the second decrypted image;

Performing inverse Fresnel transform on the secondary decrypted image to determine the decrypted image after three times of inverse Fresnel transform;

Multiplying the decrypted image after three times of inverse Fresnel transform with the conjugate of the second chaotic biological phase plate to determine the three times of decrypted image;

Performing inverse discrete cosine transform on the three decrypted images to determine the original image.

Optionally, performing inverse Fresnel transform on the reconstructed optical encrypted image to determine the decrypted image after one inverse Fresnel transform, specifically including:

Using the formula $f'(x_2, y_2) = FrT_{-z3}\{f(x_3, y_3)\}$ to perform inverse Fresnel transform on the reconstructed optical encrypted image, taking the absolute value of $f'(x_2, y_2)$ to determine the decrypted image after one inverse Fresnel transform;

Where $f'(x_2, y_2)$ is the decrypted image after an inverse Fresnel transform; $f'(x_3, y_3)$ is the reconstructed optical encrypted image; FrT is the Fresnel transform; and $z_3$ is the third transform distance:

Optionally, performing inverse Fresnel transform on the primary decrypted image to determine the decrypted image after the secondary inverse Fresnel transform, specifically including:

Using a formula $|f'(x_1, y_1)|\exp[j2\pi\varphi(x_1, y_1)] = FrT_{-z2}\{|f'(x_2, y_2)|\exp[j2\pi\varphi(x_2, y_2)]\}$ to perform inverse Fresnel transform on the first decrypted image to determine the decrypted image after the second inverse Fresnel transform;

Where $f'(x_1, y_1)$ is the decrypted image after quadratic inverse Fresnel transform; $\varphi(x_1, y_1)$ is the phase distribution function in $x_1, y_1$ domain; $z_2$ is the second transform distance; j is the imaginary number; and $\varphi(x_2, y_2)$ is the phase distribution function in $x_2, y_2$ domain.

Optionally, performing inverse Fresnel transform on the secondary decrypted image to determine the decrypted image after three times of inverse Fresnel transform, specifically including:

The formula is $|f'(x_0, y_0)|\exp[j2\pi\varphi(x_0, y_0)] = FrT_{-z1}\{|f'(x_1, y_1)|\exp[j2\pi\varphi(x_1, y_1)]\}$ used to perform inverse Fresnel transform on the secondary decrypted image to determine the decrypted image after three times of inverse Fresnel transform; $f'_1(x_0, y_0)$ is the decrypted image after three times of inverse Fresnel transform; and $\varphi(x_0, y_0)$ is the phase distribution function in $x_0, y_0$ domain.

An image encryption and decryption method based on biological information, specifically including:

The biological information includes fingerprint, iris, face, palm print, and voiceprint;

The first chaotic biological phase plate and the second chaotic biological phase plate are constructed by using the chaotic mapping method to preprocess the biological information;

Acquiring the original image to be encrypted, performing discrete cosine transform on the original image to be encrypted, and determining the encrypted image after discrete cosine transform;

Multiplying the first chaotic biological phase plate with the encrypted image after discrete cosine transform to determine the encrypted image modulated by the first chaotic biological phase plate;

Performing Fresnel transformation on the encrypted image modulated by the first chaotic biological phase plate to determine the encrypted image after the first Fresnel transformation;

Performing phase truncation and phase preservation on the encrypted image after the first Fresnel transform, and determining the encrypted image after the first phase truncation and phase preservation;

Using the second chaotic biological phase plate to multiply the encrypted image after the first phase truncation and phase preservation to determine the encrypted image after the second phase truncation and phase preservation;

Performing Fresnel transform on the encrypted image after the second phase truncation and phase preservation to obtain the encrypted image after the second Fresnel transform;

Performing phase truncation and phase preservation on the encrypted image after the second Fresnel transform to obtain the encrypted image after the second phase truncation and phase preservation;

According to the encrypted image after the second phase truncation and phase retention, the reference light is introduced for interference through Fresnel diffraction, and the light intensity distribution of the plane hologram is output; the light intensity distribution of the plane hologram is the encrypted image; and Obtaining users' biological information;

Judging whether the user is a legal user according to the biological information of the user;

If so, acquiring the first key and the second key, and irradiating the encrypted image with reference light;

According to the first key and the second key, the Fresnel inverse transform method and the chaotic mapping method are used to decrypt the encrypted image after irradiation to obtain the original image;

If not, stop decryption.

According to the specific embodiment provided by the invention, the invention discloses the following technical effects: the invention provides image encryption and decryption methods based on the biological information, preprocesses the biological information, uses the chaotic mapping method to preprocess the biological information, constructs the first chaotic biological phase plate and the second chaotic biological phase plate, and greatly reduces the key information The amount of information is large, which is conducive to transmission.

At the same time, the use of biological information has the characteristics of uniqueness and immutability, not easily stolen or lost, and can set up the authentication link in advance, but the authenticator cannot decrypt the next step.

In the process of optical encryption and decryption, biological information is used to ensure the specificity of users, further improve the security of the system, and is also conducive to the practicality of optical encryption technology. By using a computer-generated hologram (CGH), the encrypted information is real and digital, which is beneficial to storage and transmission.

BRIEF DESCRIPTION OF THE DRAWINGS

To more clearly illustrate the embodiments of the invention or the technical solutions in the prior art, the following will briefly introduce the drawings needed in the embodiments. The drawings in the following description are only some embodiments of the invention. For ordinary technicians in the art, they can also be obtained from these drawings without paying creative labor other figures.

DETAILED DESCRIPTION

The technical solutions in the embodiments of the invention will be described clearly and completely in combination with the drawings in the embodiments of the invention. The described embodiments are only part of the embodiments of the invention, not all of them. Based on the embodiments in the invention, all other embodiments obtained by ordinary technicians in the art without making creative work belong to the protection scope of the invention.

The object of the invention is to provide image encryption and decryption methods based on biological information, which can reduce the amount of information of the key, improve the efficiency of storage and transmission and security.

To make the above objects, features, and advantages of the invention more obvious and easy to understand, the invention will be further described in detail in combination with the drawings and the specific implementation mode.

Figure 1:
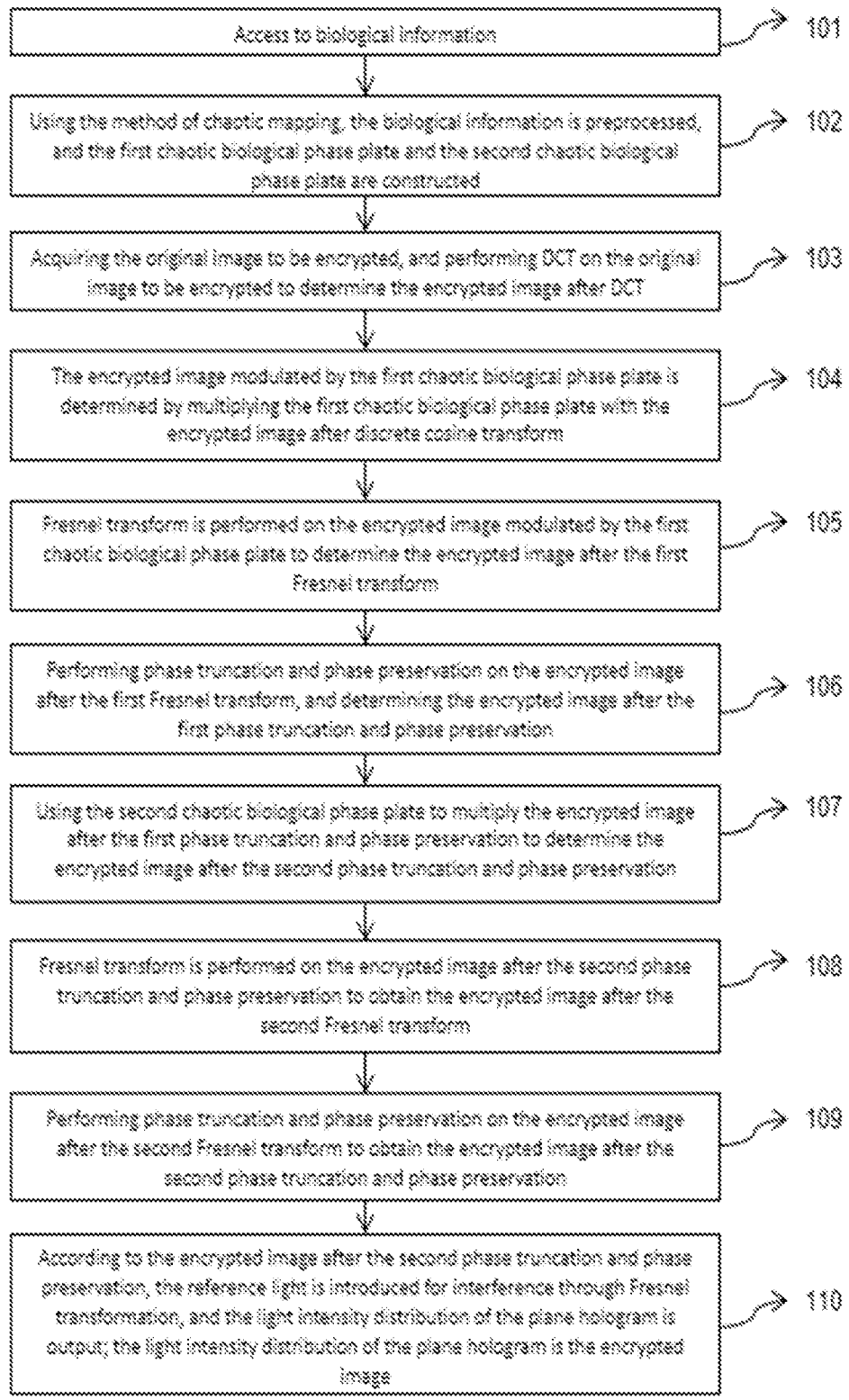
FIG. 1 is a flow chart of the image encryption method based on biological information provided by the invention.

FIG. 1 is a flow chart of an image encryption method based on biological information provided by the invention. As shown in FIG. 1, an image encryption method based on biological information includes:

Step 101: acquiring biological information, which includes fingerprint, iris, face, palm print, and voiceprint.

Step 102: preprocessing the biological information by using the chaotic mapping method, and constructing a first chaotic biological phase plate and a second chaotic biological phase plate;

Step 103: acquiring the original image to be encrypted, and performing DCT on the original image to be encrypted to determine the encrypted image after DCT;

Step 104: multiplying the first chaotic biological phase plate with the encrypted image after discrete cosine transform to determine the encrypted image modulated by the first chaotic biological phase plate;

Step 105: performing Fresnel transform on the encrypted image modulated by the first chaotic biological phase plate to determine the encrypted image after the first Fresnel transform;

Step 106: performing phase truncation and phase preservation on the encrypted image after the first Fresnel transform, and determining the encrypted image after the first phase truncation and phase preservation;

Step 107: using the second chaotic biological phase plate to multiply the encrypted image after the first phase truncation and phase preservation to determine the encrypted image after the second phase truncation and phase preservation;

Step 108: performing Fresnel transform on the encrypted image after the second phase truncation and phase preservation to obtain the encrypted image after the second Fresnel transform;

Step 109: performing phase truncation and phase preservation on the encrypted image after the second Fresnel transform to obtain the encrypted image after the second phase truncation and phase preservation;

Step 110: according to the encrypted image after the second phase truncation and phase preservation, the reference light is introduced for interference through Fresnel diffraction, and the light intensity distribution of the plane hologram is output; the light intensity distribution of the plane hologram is the encrypted image.

Figure 2:
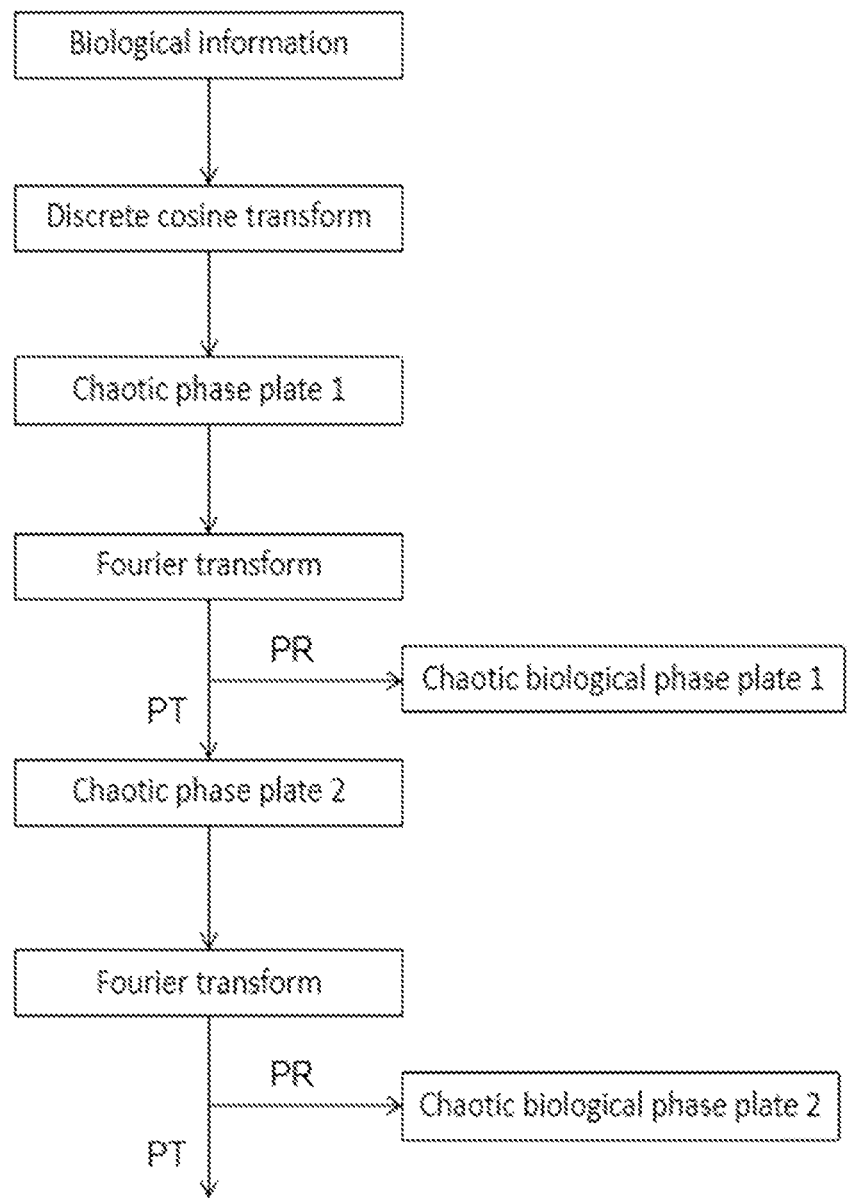
FIG. 2 is the flow chart of biological information preprocessing provided by the invention.

In practical application, the image encryption process is as follows:

FIG. 2 is the flow chart of biological information preprocessing provided by the invention. As shown in FIG. 2, biological information is preprocessed to reduce the amount of information. Discrete cosine transform (DCT) is used to process biological information, which can extract feature information and reduce the amount of information. Then, the first chaotic biological phase plate cbpm1 (chaotic biological phase plate 1) and the second chaotic biological phase plate cbpm2 (chaotic biological phase plate 2) are constructed by chaotic mapping technology. Through Fourier transform, phase truncation, and phase retention operation, the information dimension reduction and nonlinear processing are carried out, and the information security is improved.

Phase truncation and phase reservation, PT{ } for phase truncation, PR{ } for phase reservation or amplitude truncation. Suppose a complex function is:

$$f(x,y)=|f(x,y)|\exp[j2\pi\phi(x,y)] \tag{1}$$

$$PT\{f(x,y)\}=|f(x,y)| \tag{2}$$

$$PR\{f(x,y)\}=\exp[j2\pi\phi(x,y)] \tag{3}$$

f(x,y) is the function to process the image information, where x and y are the coordinate axes. | | is the absolute value and $\phi(x,y)$ is the phase distribution function.

After preprocessing, the image to be encrypted is encrypted:

The image to be encrypted in the $x_0$, $y_0$ domain is represented as $f(x_0, y_0)$, which is first transformed by discrete cosine transform to obtain $f'(x_0, y_0)$:

$$f'(x_0,y_0)=DCT\{f(x_0,y_0)\} \tag{4}$$

Then it is multiplied by the first chaotic biological phase plate CBPM1 and Fresnel transform is performed:

$$f(x_1,y_1)=FrT_{z1}\{f'(x_0,y_0)\exp[j2\pi\phi(x_0,y_0)]\} \tag{5}$$

Where FrT is Fresnel transformation, $z_1$ is transformation distance, and the transformation result is in $x_1$, $y_1$ domain. Do a phase truncation and phase reservation:

$$PT\{f(x_1,y_1)\}=|f(x_1,y_1)| \tag{6}$$

$$PR\{f(x_1,y_1)\}=\exp[j2\pi\phi(x_1,y_1)]=RPM_1 \tag{7}$$

Save $RPM_1$. After phase truncation, the second chaotic biological phase plate $CBPM_2$ is multiplied, and the Fresnel transform of the distance $z_2$ is performed again to obtain $f(x_2, y_2)$:

$$f(x_2,y_2)=FrT_{z2}\{|f(x_1,y_1)|\exp[j2\pi\phi(x_1,y_1)]\} \tag{8}$$

The transformation results are in the $x_2$, $y_2$ domain. Do phase truncation and phase reservation again, $$PT\{f(x_2,y_2)\}=|f(x_2,y_2)| \tag{9}$$

$$PR\{f(x_2,y_2)\}=\exp[j2\pi\phi(x_2,y_2)]=RPM_2 \tag{10}$$

Save $RPM_2$. After phase truncation, as the original image of Fresnel computer-generated hologram, Fresnel computer-generated hologram is produced. Among them, $x_0$, $y_0$ domain, $x_1$, $y_1$ domain, and $x_2$, $y_2$ domain are different input planes.

After Fresnel diffraction of distance $z_3$, the complex amplitude distribution is obtained in the output plane:

$$f(x_3,y_3)=FrT_{Z3}\{|x_2,y_2)|\} \qquad (11)$$

The transformation results are in the $x_3$, $y_3$ domain. By introducing the interference between the reference light $R(x_3, y_3)$ and $f(x_3, y_3)$, the light intensity of the hologram is obtained in the output plane:

$$I(x_3,y_3)=|R(x_3,y_3)+f(x_3,y_3)|^2 \qquad (12)$$

Figure 3:
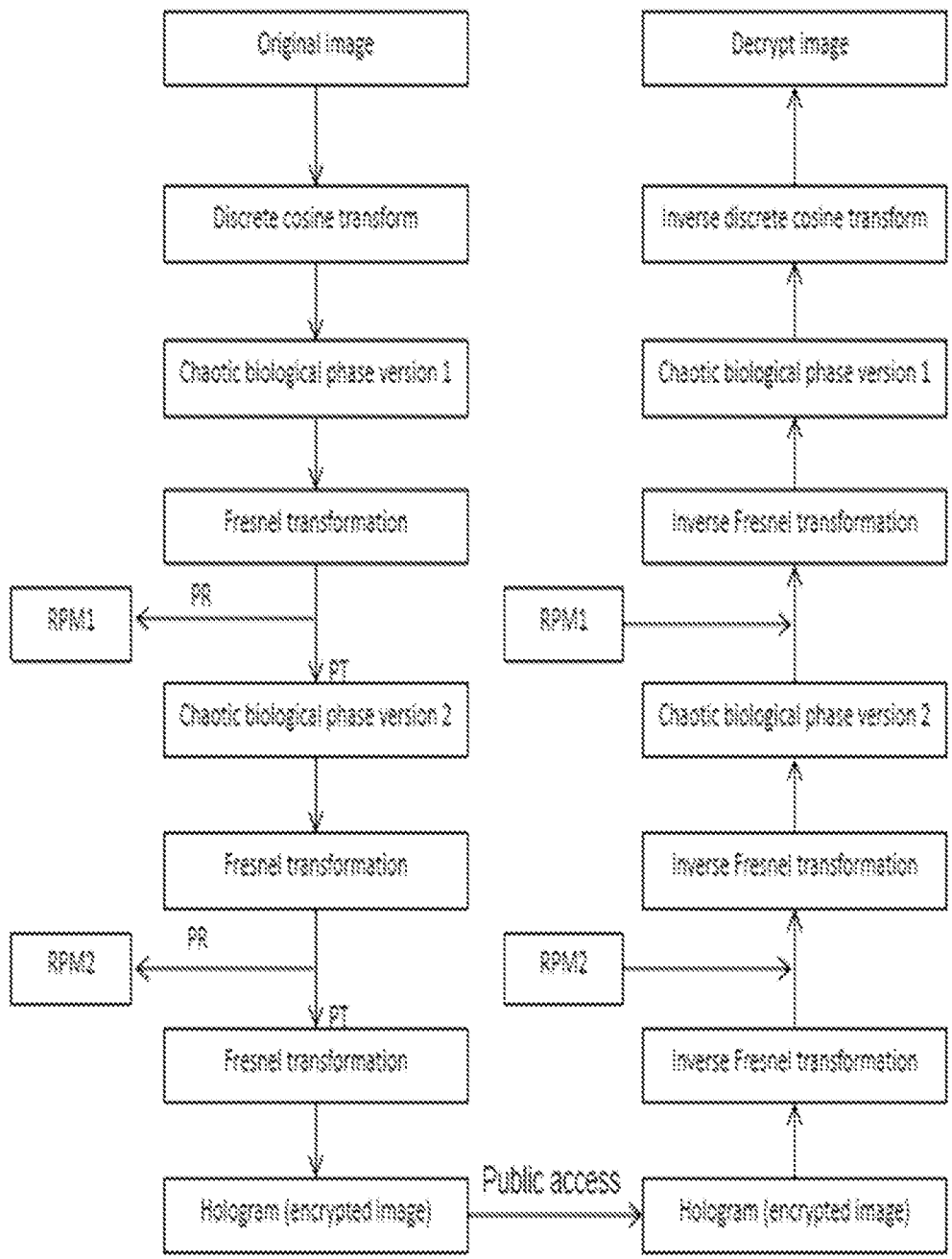
FIG. 3 is the flow chart of the image encryption and decryption method based on the biological information provided by the invention.

Where, $I(x_3, y_3)$ is the encryption result (encryption diagram), as shown in FIG. 3.

Figure 4:
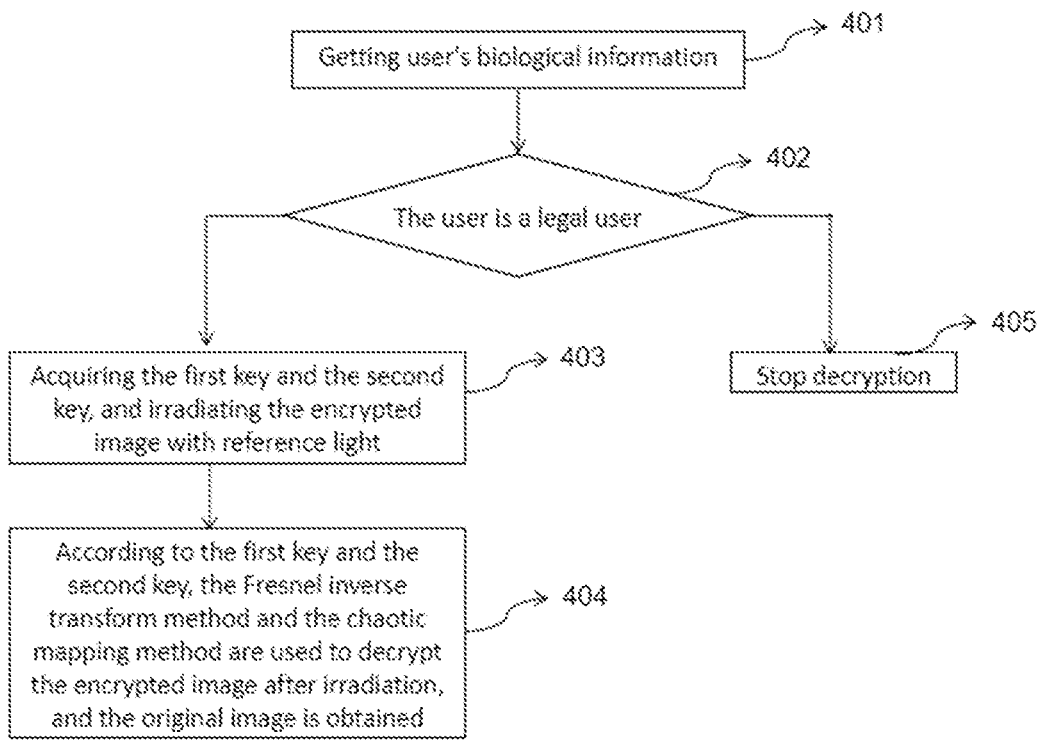
FIG. 4 is a flow chart of the image decryption method based on biological information provided by the invention.

FIG. 4 is a flow chart of an image decryption method based on biological information provided by the invention. As shown in FIG. 4, an image decryption method based on biological information includes:

Step 401: obtaining the user's biological information.

Step 402: judge whether the user is a legal user according to the user's biological information, if so, execute step 403; if not, execute step 405.

Step 403: acquiring the first key and the second key, and irradiating the encrypted image with the reference light;

Step 404: according to the first key and the second key, using the Fresnel inverse transform method and the chaotic mapping method to decrypt the encrypted image after irradiation and obtain the original image;

Step 405: stop decryption.

Step 404 specifically includes: irradiating the encrypted image with the reference light to determine the reproduction light encrypted image; performing inverse Fresnel transform on the reconstructed optical encrypted image to determine the decrypted image after one inverse Fresnel transform; multiplying the decrypted image after the first inverse Fresnel transform with the second key to determine the first decrypted image; the image is deciphered by the inverse Fresnel transform; multiplying the decrypted image after the second inverse Fresnel transform by the conjugate of the first chaotic biological phase plate to determine the second decrypted image; performing inverse Fresnel transform on the secondary decrypted image to determine the decrypted image after three times of inverse Fresnel transform; multiplying the decrypted image after three times of inverse Fresnel transform with the conjugate of the second chaotic biological phase plate to determine the three times of decrypted image; performing inverse discrete cosine transform on the three decrypted images to determine the original image.

Decryption is the reverse of encryption.

The reconstructed light $f(x_3, y_3)$ is obtained by irradiating the encrypted image (computer-generated hologram) $I(x_3, y_3)$ with the reference light R. For $f(x_3, y_3)$ through the inverse Fresnel transformation of distance $z_3$, $$f'(x_2,y_2)=FrT_{-z3}\{f(x_3,y_3)\} \qquad (13)$$

Take the absolute value of $f'(x_2, y_2)$ to get the original image of CGH.

The original image of a computer-generated hologram is multiplied by the first key $RPM_2$ and the inverse Fresnel transform of distance $z_2$ is performed:

$$|f'(x_1,y_1)|\exp[j2\pi\varphi(x_1,y_1)]=FrT_{-z2}\{|f'(x_2,y_2)|\exp[j2\pi\varphi(x_2,y_2)]\} \qquad (14)$$

$|f'(x_1, y_1)|$ is obtained by multiplying the conjugate exp $[-j2\pi\varphi(x_0, y_0)]$ of the chaotic biological phase mask $CFPM_1$, and then the key $RPM_1$ is multiplied to perform an inverse Fresnel transform of distance $z_1$:

$$|f'(x_0,y_0)|\exp[j2\pi\varphi(x_0,y_0)]=FrT_{-z1}\{|f'(x_1,y_1)|\exp[j2\pi\varphi(x_1,y_1)]\} \qquad (15)$$

Multiply the conjugate $\exp[-j2\pi\varphi(x_0, y_0)]$ of chaotic biological phase mask $CFPM_1$ to get $f'_1(x_0, y_0)$. Do an inverse DCT:

$$f(x_0,y_0)=IDCT\{f'_1(x_0,y_0)\} \qquad (16)$$

Get $f(x_0, y_0)$ the original image. The image to be encrypted is recovered.

Figure 5:
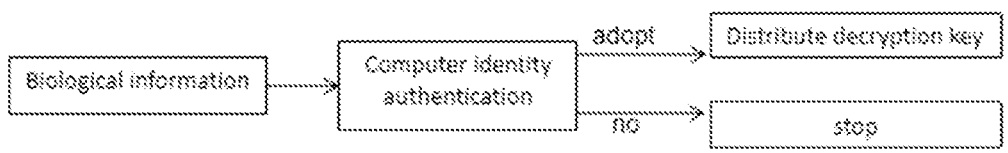
FIG. 5 is a flow chart of the identity authentication process provided by the invention.

In practical application, FIG. 5 is the flow chart of the identity authentication process provided by the invention. As shown in FIG. 5, to obtain the decryption information, the identity authentication needs to be carried out first to determine whether the user is legal. The identity information provided by the user is compared with the identity information stored in the identity library. If you confirm that you are a legitimate user, you can obtain the decryption key for the next decryption. Otherwise, the decryption key cannot be obtained and decryption cannot be performed.

An image encryption and decryption method based on biological information, specifically including:

The biological information includes fingerprint, iris, face, palm print, and voiceprint;

The first chaotic biological phase plate and the second chaotic biological phase plate are constructed by using the chaotic mapping method to preprocess the biological information;

Acquiring the original image to be encrypted, performing discrete cosine transform on the original image to be encrypted, and determining the encrypted image after discrete cosine transform;

Multiplying the first chaotic biological phase plate with the encrypted image after discrete cosine transform to determine the encrypted image modulated by the first chaotic biological phase plate;

Performing Fresnel transformation on the encrypted image modulated by the first chaotic biological phase plate to determine the encrypted image after the first Fresnel transformation;

Performing phase truncation and phase preservation on the encrypted image after the first Fresnel transform, and determining the encrypted image after the first phase truncation and phase preservation;

Using the second chaotic biological phase plate to multiply the encrypted image after the first phase truncation and phase preservation to determine the encrypted image after the second phase truncation and phase preservation;

Performing Fresnel transform on the encrypted image after the second phase truncation and phase preservation to obtain the encrypted image after the second Fresnel transform;

Performing phase truncation and phase preservation on the encrypted image after the second Fresnel transform to obtain the encrypted image after the second phase truncation and phase preservation;

According to the encrypted image after the second phase truncation and phase retention, the reference light is introduced for interference through Fresnel diffraction, and the light intensity distribution of the plane hologram is output; the light intensity distribution of the plane hologram is the encrypted image;

Obtaining users' biological information;

Judging whether the user is a legal user according to the biological information of the user;

If so, acquiring the first key and the second key, and irradiating the encrypted image with reference light;

According to the first key and the second key, the Fresnel inverse transform method and the chaotic mapping method are used to decrypt the encrypted image after irradiation to obtain the original image;

If not, stop decryption.

The invention combines identity authentication, biological information, chaos technology, and computer-generated hologram technology to construct a high-security optical encryption system.

Embodiments of the present invention further include the following:

1. The invention contains multiple keys, the key is associated with biological information, and the system has asymmetry, so the system has high security. And before decryption, the system can set up the biological information authentication link in advance, and decryption can be carried out only after the authentication is passed, otherwise, the decryption key cannot be obtained, which further improves the security of the system.

2. Chaos technology can reduce the amount of information, combined with the advantages of a digital computer-generated hologram, so the scheme is thereby conducive to the preservation and transmission of encrypted information. Research shows that the biggest advantage of the scheme is that it has strong anti-clipping ability, and it can recover the main information of plaintext after losing part or most of the information.

Each embodiment in this specification is described in a progressive manner, and each embodiment focuses on the differences from other embodiments. The same and similar parts of each embodiment can be referred to each other.

Specific examples are provided to help explain the principle and implementation mode of the invention, and the above description of the embodiment is only used to help understand the method and core idea of the invention; meanwhile, for the general technical personnel in the field, there will be changes in the specific implementation mode and application scope according to the idea of the invention. To sum up, the content of the specification shall not be interpreted as a limitation of the invention.

What is claimed is:

1. An image encryption method based on biological information, comprising:

acquiring biological information that comprises fingerprint, iris, face, palm print, and voiceprint;

preprocessing the biological information by using a chaotic mapping method, to construct a first chaotic biological phase plate and a second chaotic biological phase plate;

acquiring an original image to be encrypted, performing discrete cosine transform on the original image to be encrypted to obtain an encrypted image after discrete cosine transform;

multiplying the first chaotic biological phase plate with the encrypted image after discrete cosine transform to obtain an encrypted image modulated by the first chaotic biological phase plate;

performing a first Fresnel transformation on the encrypted image modulated by the first chaotic biological phase plate to obtain an encrypted image after the first Fresnel transformation;

performing a first phase truncation and phase preservation on the encrypted image after the first Fresnel transform, to obtain an encrypted image after the first phase truncation and phase preservation;

multiplying the second chaotic biological phase plate with the encrypted image after the first phase truncation and phase preservation, to obtain an encrypted image modulated by the second chaotic biological phase plate;

performing a second Fresnel transform on the encrypted image modulated by the second chaotic biological phase plate to obtain an encrypted image after the second Fresnel transform;

performing a second phase truncation and phase preservation on the encrypted image after the second Fresnel transform to obtain an encrypted image after the second phase truncation and phase preservation;

causing the encrypted image after the second phase truncation and phase preservation to undergo Fresnel diffraction, and an interference with an introduced reference light, to output a light intensity distribution of a plane hologram, as a final encrypted image.

2. The image encryption method based on biological information according to claim 1, wherein the performing a first Fresnel transformation on the encrypted image modulated by the first chaotic biological phase plate to obtain an encrypted image after the first Fresnel transformation, comprises:

performing, according to a formula $f(x_1,y_1)=FrT_{z1}\{f'(x_0,y_0)\exp[j2\pi\phi(x_0,y_0)]\}$, the first Fresnel transform on the encrypted image modulated by the first chaotic biological phase plate to obtain the encrypted image after the first Fresnel transform;

wherein $f(x_1,y_1)$ is the encrypted image after the first Fresnel transform; FrT is a Fresnel transform; $z_1$ is a first transform distance; $f'(x_0,y_0)$ is the encrypted image after discrete cosine transform; $\phi(x_0,y_0)$ is a phase distribution function in $x_0,y_0$ domain; and j is an imaginary number.

3. The image encryption method based on biological information according to claim 2, wherein the performing a first phase truncation and phase preservation on the encrypted image after the first Fresnel transform, to obtain an encrypted image after the first phase truncation and phase preservation, comprises:

performing, according to formulas $PT\{f(x_1,y_1)\}=|f(x_1,y_1)|$ and $PR\{f(x_1,y_1)\}=\exp[j2\pi\phi(x_1,y_1)]=RPM_1$, the first phase truncation and phase preservation on the encrypted image after the first Fresnel transform to obtain the encrypted image after the first phase truncation and phase preservation;

wherein $PT\{f(x_1,y_1)\}$ is a phase truncation in $x_1,y_1$ domain; $PR\{f(x_1,y_1)\}$ is a phase reservation in $x_1,y_1$ domain; $\phi(x_1,y_1)$ is a phase distribution function in $x_1,y_1$ domain; and $RPM_1$ is a first key.

4. The image encryption method based on biological information according to claim 3, wherein the performing a second phase truncation and phase preservation on the encrypted image after the second Fresnel transforms to obtain an encrypted image after the second phase truncation and phase preservation, comprises:

performing according to formulas $PT\{f(x_2,y_2)\}=|f(x_2,y_2)|$ and $PR\{f(x_2,y_2)\}=\exp[j2\pi\phi(x_2,y_2)]=RPM_2$, the second phase truncation and phase preservation on the encrypted image after the second Fresnel transform to obtain the encrypted image after the second phase truncation and phase preservation;

wherein $f(x_2,y_2)$ is the encrypted image after the second Fresnel transform; $PT\{f(x_2,y_2)\}$ is a phase truncation in $x_2,y_2$ domain; $PR\{f(x_2,y_2)\}$ is a phase reservation in $x_2,y_2$ domain; $\phi(x_2,y_2)$ is a phase distribution function in $x_2,y_2$ domain; and $RPM_2$ is a second key.

5. The image decryption method based on biological information according to claim 1, further comprising:

obtaining users' biological information;
judging whether the user is a legal user according to the biological information of the user;
if so, acquiring the first key and the second key, and irradiating the final encrypted image with reference light;
decrypting the final encrypted image after irradiation according to the first key and the second key by using a Fresnel inverse transform method and the chaotic mapping method, to obtain the original image;
if not, stopping decryption.

6. The image decryption method based on biological information according to claim 5, wherein performing a first Fresnel transformation on the encrypted image modulated by the first chaotic biological phase plate to obtain an encrypted image after the first Fresnel transformation, comprises:

performing, according to a formula $f(x_1,y_1)=FrT_{z1}\{f'(x_0,y_0)\exp[j2\pi\phi(x_0,y_0)]\}$, the first Fresnel transform on the encrypted image modulated by the first chaotic biological phase plate to obtain the encrypted image after the first Fresnel transform;

wherein $f(x_1,y_1)$ is the encrypted image after the first Fresnel transform; FrT is a Fresnel transform; $z_1$ is a first transform distance; $f'(x_0,y_0)$ is an encrypted image after discrete cosine transform; $\phi(x_0,y_0)$ is a phase distribution function in $x_0,y_0$ domain; and j is an imaginary number.

7. The image decryption method based on biological information according to claim 6, wherein performing a first phase truncation and phase preservation on the encrypted image after the first Fresnel transform, to obtain an encrypted image after the first phase truncation and phase preservation, comprises:

performing, according to formulas $PT\{f(x_1,y_1)\}=|f(x_1,y_1)|$ and $PR\{f(x_1,y_1)\}=\exp[j2\pi\phi(x_1,y_1)]=RPM_1$, the first phase truncation and phase preservation on the encrypted image after the first Fresnel transform to obtain the encrypted image after the first phase truncation and phase preservation;

wherein $PT\{f(x_1,y_1)\}$ is a phase truncation in $x_1,y_1$ domain; $PR\{f(x_1,y_1)\}$ is a phase reservation in $x_1,y_1$ domain; $\phi(x_1,y_1)$ is a phase distribution function in $x_1, y_1$ domain; and $RPM_1$ is a first key.

8. The image decryption method based on biological information according to claim 7, wherein performing a second phase truncation and phase preservation on the encrypted image after the second Fresnel transforms to obtain an encrypted image after the second phase truncation and phase preservation, comprises:

performing, according to formulas $PT\{f(x_2,y_2)\}=|f(x_2,y_2)|$ and $PR\{f(x_2,y_2)\}=\exp[j2\pi\phi(x_2,y_2)]=RPM_2$, the second phase truncation and phase preservation on the encrypted image after the second Fresnel transform to obtain the encrypted image after the second phase truncation and phase preservation;

wherein $f(x_2,y_2)$ is the encrypted image after the second Fresnel transform; $PT\{f(x_2,y_2)\}$ is a phase truncation in $x_2,y_2$ domain; $PR\{f(x_2,y_2)\}$ is a phase reservation in $x_2,y_2$ domain; $\phi(x_2,y_2)$ is a phase distribution function in $x_2,y_2$ domain; and $RPM_2$ is a second key.

9. The image decryption method based on biological information according to claim 5, wherein decrypting the final encrypted image after irradiation according to the first key and the second key by using a Fresnel inverse transform method and the chaotic mapping method, to obtain the original image, comprises:

illuminating the final encrypted image by using the reference light to obtain a reconstructed optical encrypted image;

performing a first inverse Fresnel transform on the reconstructed optical encrypted image to obtain a decrypted image after the first inverse Fresnel transform;

multiplying the decrypted image after the first inverse Fresnel transform with the second key to obtain a first decrypted image;

performing a second inverse Fresnel transform on the first decrypted image to obtain a decrypted image after the second inverse Fresnel transform;

multiplying the decrypted image after the second inverse Fresnel transform by a conjugate of the first chaotic biological phase plate to obtain a second decrypted image;

performing a third inverse Fresnel transform on the second decrypted image to obtain a decrypted image after the third inverse Fresnel transform;

multiplying the decrypted image after the third inverse Fresnel transform with a conjugate of the second chaotic biological phase plate to obtain a third decrypted image;

performing an inverse discrete cosine transform on the third decrypted image to obtain the original image.

10. The image decryption method based on biological information according to claim 6, wherein decrypting the final encrypted image after irradiation according to the first key and the second key by using a Fresnel inverse transform method and the chaotic mapping method, to obtain the original image, comprises:

illuminating the final encrypted image by using the reference light to obtain a reconstructed optical encrypted image;

performing a first inverse Fresnel transform on the reconstructed optical encrypted image to obtain a decrypted image after the first inverse Fresnel transform;

multiplying the decrypted image after the first inverse Fresnel transform with the second key to obtain a first decrypted image;

performing a second inverse Fresnel transform on the first decrypted image to obtain a decrypted image after the second inverse Fresnel transform;

multiplying the decrypted image after the second inverse Fresnel transform by a conjugate of the first chaotic biological phase plate to obtain a second decrypted image;

performing a third inverse Fresnel transform on the second decrypted image to obtain a decrypted image after the third inverse Fresnel transform;

multiplying the decrypted image after the third inverse Fresnel transform with a conjugate of the second chaotic biological phase plate to obtain a third decrypted image;

performing an inverse discrete cosine transform on the third decrypted images to obtain the original image.

11. The image decryption method based on biological information according to claim 7, wherein decrypting the final encrypted image after irradiation according to the first key and the second key by using a Fresnel inverse transform method and the chaotic mapping method, to obtain the original image, comprises:

illuminating the final encrypted image by using the reference light to obtain a reconstructed optical encrypted image;

performing a first inverse Fresnel transform on the reconstructed optical encrypted image to obtain a decrypted image after the first inverse Fresnel transform;

multiplying the decrypted image after the first inverse Fresnel transform with the second key to obtain a first decrypted image;

performing a second inverse Fresnel transform on the first decrypted image to obtain a decrypted image after the second inverse Fresnel transform;

multiplying the decrypted image after the second inverse Fresnel transform by a conjugate of the first chaotic biological phase plate to obtain a second decrypted image;

performing a third inverse Fresnel transform on the second decrypted image to obtain a decrypted image after the third inverse Fresnel transform;

multiplying the decrypted image after the third inverse Fresnel transform with a conjugate of the second chaotic biological phase plate to obtain a third decrypted image;

performing an inverse discrete cosine transform on the third decrypted images to obtain the original image.

12. The image decryption method based on biological information according to claim 8, wherein decrypting the final encrypted image after irradiation according to the first key and the second key by using a Fresnel inverse transform method and the chaotic mapping method, to obtain the original image, comprises:

illuminating the final encrypted image by using the reference light to obtain a reconstructed optical encrypted image;

performing a first inverse Fresnel transform on the reconstructed optical encrypted image to obtain a decrypted image after the first inverse Fresnel transform;

multiplying the decrypted image after the first inverse Fresnel transform with the second key to obtain a first decrypted image;

performing a second inverse Fresnel transform on the first decrypted image to obtain a decrypted image after the second inverse Fresnel transform;

multiplying the decrypted image after the second inverse Fresnel transform by a conjugate of the first chaotic biological phase plate to obtain a second decrypted image;

performing a third inverse Fresnel transform on the second decrypted image to obtain a decrypted image after the third inverse Fresnel transform;

multiplying the decrypted image after the third inverse Fresnel transform with a conjugate of the second chaotic biological phase plate to obtain a third decrypted image;

performing an inverse discrete cosine transform on the third decrypted images to obtain the original image.

13. The image decryption method based on biological information according to claim 9, wherein performing a first inverse Fresnel transform on the reconstructed optical encrypted image to obtain a decrypted image after the first inverse Fresnel transform, comprises:

using a formula $f'(x_2,y_2)=FrT_{-z3}\{f(x_3,y_3)\}$ to perform the first inverse Fresnel transform on the reconstructed optical encrypted image, and obtaining an absolute value of $f'(x_2,y_2)$ to obtain the decrypted image after the first inverse Fresnel transform;

wherein $f'(x_2,y_2)$ is the decrypted image after the first inverse Fresnel transform; $f(x_3,y_3)$ is the reconstructed optical encrypted image; FrT is a Fresnel transform; and $z_3$ is a third transform distance.

14. The image decryption method based on biological information according to claim 10, wherein performing a first inverse Fresnel transform on the reconstructed optical encrypted image to obtain a decrypted image after the first inverse Fresnel transform, comprises:

using a formula $f'(x_2,y_2)=FrT_{-z3}\{f(x_3,y_3)\}$ to perform the first inverse Fresnel transform on the reconstructed optical encrypted image, and obtaining an absolute value of $f'(x_2,y_2)$ to determine obtain the decrypted image after the first inverse Fresnel transform;

wherein $f'(x_2,y_2)$ is the decrypted image after the first inverse Fresnel transform; $f(x_3,y_3)$ is the reconstructed optical encrypted image; FrT is a Fresnel transform; and $z_3$ is a third transform distance.

15. The image decryption method based on biological information according to claim 11, wherein performing a first inverse Fresnel transform on the reconstructed optical encrypted image to obtain a decrypted image after the first inverse Fresnel transform, comprises:

using a formula $f'(x_2,y_2)=FrT_{-z3}\{f(x_3,y_3)\}$ to perform the first inverse Fresnel transform on the reconstructed optical encrypted image, and obtaining an absolute value of $f'(x_2,y_2)$ to obtain the decrypted image after the first inverse Fresnel transform;

wherein $f'(x_2,y_2)$ is the decrypted image after the first inverse Fresnel transform; $f(x_3,y_3)$ is the reconstructed optical encrypted image; FrT is a Fresnel transform; and $z_3$ is a third transform distance.

16. The image decryption method based on biological information according to claim 12, wherein performing a first inverse Fresnel transform on the reconstructed optical encrypted image to obtain the decrypted image after the first inverse Fresnel transform, comprises:

using a formula $f'(x_2,y_2)=FrT_{-z3}\{f(x_3,y_3)\}$ to perform the first inverse Fresnel transform on the reconstructed optical encrypted image, and obtaining an absolute value of $f'(x_2,y_2)$ to obtain the decrypted image after the first inverse Fresnel transform;

wherein $f'(x_2,y_2)$ is the decrypted image after the first inverse Fresnel transform; $f(x_3,y_3)$ is the reconstructed optical encrypted image; FrT is a Fresnel transform; and $z_3$ is a third transform distance.

17. The image decryption method based on biological information according to claim 13, wherein performing a second inverse Fresnel transform on the first decrypted image to obtain a decrypted image after the second inverse Fresnel transform, comprises:

using a formula $|f(x_1,y_1)|\exp[j2\pi\varphi(x_1,y_1)]=FrT_{-z3}\{f'(x_2,y_2)|\exp[j2\pi\varphi(x_2,y_2)]\}$ to perform the second inverse Fresnel transform on the first decrypted image to obtain the decrypted image after the second inverse Fresnel transform;

wherein $f'(x_1,y_1)$ is the decrypted image after the second inverse Fresnel transform; $\phi(x_1,y_1)$ is a phase distribution function in a domain $x_1,y_1$; $z_2$ is a second transform distance; j is an imaginary number, and $\phi(x_2,y_2)$ is phase distribution function in a domain $x_2,y_2$.

18. The image decryption method based on biological information according to claim 14, wherein performing a second inverse Fresnel transform on the first decrypted image to obtain a decrypted image after the second inverse Fresnel transform, comprises:

using a formula $|f(x_1,y_1)|\exp[j2\pi\varphi(x_1,y_1)]=FrT_{-z2}\{f'(x_2,y_2)|\exp[j2\pi\varphi(x_2,y_2)]\}$ to perform the second inverse Fresnel transform on the first decrypted image to obtain the decrypted image after the second inverse Fresnel transform;

wherein f'($x_1,y_1$) is the decrypted image after the quadratic second inverse Fresnel transform; φ($x_1,y_1$) is a phase distribution function in a domain $x_1,y_1$; $z_2$ is a second transform distance; j is an imaginary number; and φ($x_2,y_2$) is a phase distribution function in a domain $x_2,y_2$.

19. The image decryption method based on biological information according to claim 17, wherein performing a third inverse Fresnel transform on the second decrypted image to obtain a decrypted image after the third inverse Fresnel transform, comprises:

using a formula |f'$_1$($x_0,y_0$)|exp[j7πφ($x_0,y_0$)]=FrT$_{-z1}$ {f'($x_1,y_1$)|exp[j2πφ($x_1,y_1$)]} to perform the third inverse Fresnel transform on the second decrypted image to obtain the decrypted image after the third inverse Fresnel transform; wherein f'$_1$($x_0,y_0$) is the decrypted image after the third inverse Fresnel transform; φ($x_0,y_0$) is a phase distribution function in $x_0,y_0$ domain.

20. A method for encrypting and decrypting biological information based on a biological image, comprising:

acquiring biological information that comprises fingerprint, iris, face, palm print, and voiceprint;

preprocessing the biological information using a chaotic mapping method to construct a first chaotic biological phase plate and a second chaotic biological phase plate;

acquiring an original image to be encrypted, and performing discrete cosine transform on the original image to be encrypted, to obtain an encrypted image after discrete cosine transform;

multiplying the first chaotic biological phase plate with the encrypted image after discrete cosine transform to obtain an encrypted image modulated by the first chaotic biological phase plate;

performing a first Fresnel transformation on the encrypted image modulated by the first chaotic biological phase plate to obtain an encrypted image after the first Fresnel transformation;

performing a first phase truncation and phase preservation on the encrypted image after the first Fresnel transform to obtain an encrypted image after the first phase truncation and phase preservation;

multiplying the second chaotic biological phase plate with the encrypted image after the first phase truncation and phase preservation to obtain an encrypted image modulated by the second chaotic biological phase plate;

performing a second Fresnel transform on the encrypted image modulated by the second chaotic biological phase plate to obtain an encrypted image after the second Fresnel transform;

performing a second phase truncation and phase preservation on the encrypted image after the second Fresnel transform to obtain an encrypted image after the second phase truncation and phase preservation;

causing the encrypted image after the second phase truncation and phase preservation to undergo Fresnel diffraction, and an interference with an introduced reference light to output a light intensity distribution of a plane hologram as a final encrypted image; and;

obtaining users' biological information;

judging whether the user is a legal user according to the biological information of the user;

if so, acquiring a first key and a second key, and irradiating the final encrypted image with reference light;

decrypting the final encrypted image after irradiation according to the first key and the second key; by using a Fresnel inverse transform method and the chaotic mapping method to obtain the original image;

if not, stopping decryption.

* * * * *